(12) United States Patent
Enomoto et al.

(10) Patent No.: US 6,558,527 B2
(45) Date of Patent: May 6, 2003

(54) APPARATUS AND METHOD FOR ELECTROCHEMICALLY REMOVING FINE METAL PARTICLES FROM EMULSIONS

(75) Inventors: Yukio Enomoto, Gifu (JP); Toshiaki Yamamoto, 4-106 Fudai-Takusha, 23, Ohnoshiba-cho, Sakai-shi, Osaka 599-8233 (JP); Chen-Lu Yang, 43 Rector St., Millburn, NJ (US) 07041

(73) Assignees: Enomoto Industry Co., Ltd., Gifu-Ken (JP); Toshiaki Yamamoto, Osaka (JP); Chen-Lu Yang, Millburn, NJ (US)

(*) Notice: Subject to any disclaimer, the term of this patent is extended or adjusted under 35 U.S.C. 154(b) by 0 days.

(21) Appl. No.: 09/768,424

(22) Filed: Jan. 24, 2001

(65) Prior Publication Data

US 2002/0096437 A1 Jul. 25, 2002

(51) Int. Cl.[7] .................................................. C02F 1/465
(52) U.S. Cl. ...................... 205/757; 204/242; 204/275.1
(58) Field of Search ............................... 205/757, 242, 205/275.1

(56) References Cited

U.S. PATENT DOCUMENTS 3,479,281 A * 11/1969 Kikindai et al. ............ 205/757
4,012,319 A * 3/1977 Ramirez .................... 205/757
4,197,180 A * 4/1980 Woodward ................. 205/757
4,623,436 A * 11/1986 Umehara ................... 205/757

FOREIGN PATENT DOCUMENTS

| DE | 26 44 744 A1 | 4/1978 |
| DE | 37 23745 C1 | 9/1988 |
| DE | 42 30765 A1 | 3/1994 |
| DE | 44 43 297 C1 | 3/1996 |
| JP | 6-154509 | 3/1994 |

* cited by examiner

Primary Examiner—Arun S. Phasge
(74) Attorney, Agent, or Firm—Caesar, Riyise, Bernstein, Cohen & Pokotilow, Ltd.

(57) ABSTRACT

An apparatus electrochemically removes fine metal particles from an oil in water emulsion. The apparatus has a container for accommodating the emulsion. A supply port supplies the emulsion to the container. A plurality of cathode plates and anode plates are located in the container to face each other. The water in the emulsion is electrolyzed when a predetermined direct voltage is applied between the plates. The fine metal particles float with hydrogen generated by the electrolysis. $Al(OH)_3$ attaches to $H_2$ bubbles. A discharge port is located in a lower part of the container for discharging the emulsion from which the fine metal particles, sludge, oil and greese have been removed.

11 Claims, 3 Drawing Sheets

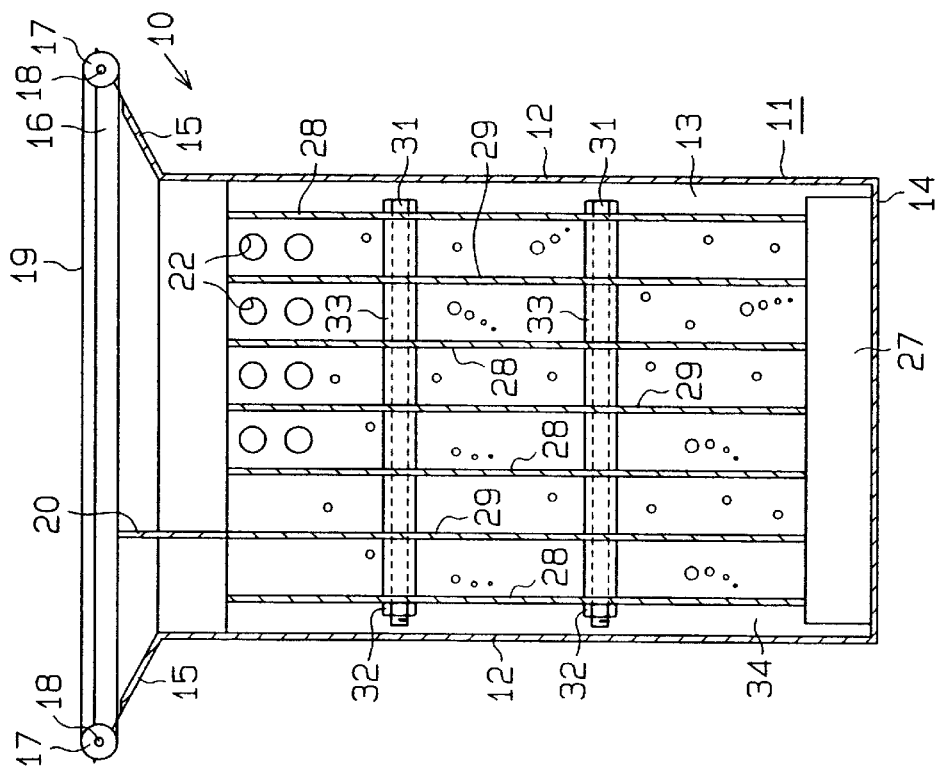
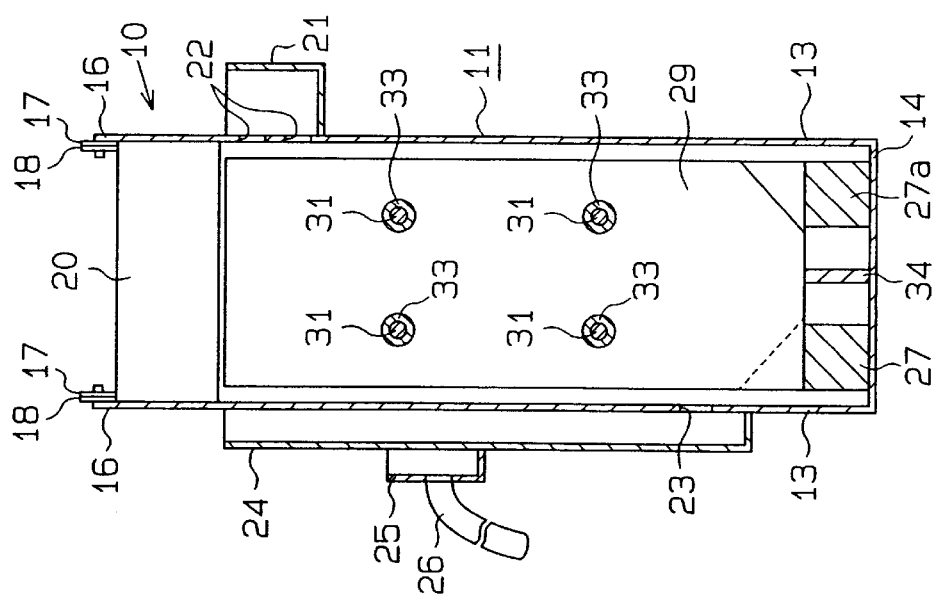

APPARATUS AND METHOD FOR ELECTROCHEMICALLY REMOVING FINE METAL PARTICLES FROM EMULSIONS

BACKGROUND OF THE INVENTION

The present invention relates to an apparatus and a method for removing fine metal particles and the like from a cutting oil used in cutting aluminum or the like, for example, for aircraft materials. More particularly, the present invention relates to an apparatus and a method for electrochemically removing fine metal particles from an emulsion to clean cutting oil.

Conventionally, when an aluminum alloy workpiece to be cut is machined into a desired shape using a cutting machine, cutting oil has been used for cooling the workpiece at the cutting location and for imparting fluidity to the metal chips. An emulsion of oil in water having a water:oil mixing ratio of 95:5 is mainly used.

To reuse the emulsion, fine metal particles, grease and lubricating oil are removed. According to the conventional removal operation, the used emulsion is subjected to centrifugation or filtration.

However, the fine metal particles have extremely small diameters, and further, the difference in the specific gravity between water and the fine metal particles, particularly of aluminum, contained in the cutting oil subjected to centrifugation is not large. Therefore, water and fine metal particles cannot be fully separated from each other by means of centrifugation. Meanwhile, when the emulsion is subjected to filtration, the fine metal particles that have very small diameters pass through the filter. Therefore, the fine metal particles contained in the emulsion cannot be removed completely.

Further, when a filter is used in the removal of fine metal particles, the fine metal particles clog the filter, and maintenance is needed.

SUMMARY OF THE INVENTION

It is a first object of the present invention to provide an apparatus and a method for removing electrochemically fine metal particles in an emulsion to clean and reuse the emulsion.

It is a second object of the present invention to provide an apparatus and a method for removing fine metal particles that reduce maintenance requirements and facilitates removal of fine metal particles.

To achieve the above objects, the present invention provides an apparatus for electrochemically removing fine metal particles in an oil and water emulsion. The apparatus includes a container for accommodating the oil in water emulsion. A supply port supplies the emulsion to the container. A plurality of cathode plates and anode plates are located in the container to face each other. The water in the emulsion is electrolyzed when a predetermined direct voltage is applied between each anode plate and each cathode plate. The fine metal particles along with sludge, greese and lubricating oil which is the main odor float with hydrogen generated by the electrolysis. A discharge port is located in the lower part of the container, and the oil in water emulsion is discharged without the metal particles.

The present invention also provides an electrochemical removing method for removing fine metal particles. The method includes supplying an oil in water emulsion to a container from a supply port on the container, supplying the emulsion between a plurality of anode plates and cathode plates located in the container to face each other, applying a predetermined direct voltage to the emulsion to electrolyze water in the emulsion and to remove the fine metal particles with hydrogen generated from the anode plate by the electrolysis, and discharging the emulsion, from which the fine metal particles have been removed, from the discharge port.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 3 is a cross-sectional view taken along the line 3—3 in FIG. 1; and

FIG. 4 is a cross-sectional view taken along the line 4—4 in FIG. 1.

DETAILED DESCRIPTION OF THE PREFERRED EMBODIMENTS

A first embodiment of the present invention will be described below with reference to FIGS. 1 to 4.

The oil in water emulsion referred to in this description is a mixture of water and an oil having a water:oil mixing ratio of 95:5. In the present embodiment, Sindol 3201 (trade name), manufactured by Houghton Japan Co., Ltd., is used as the emulsion. This emulsion has, as physical properties, a hydrogen ion concentration (pH) of 7.2 and a friction coefficient of 0.11. Further, the emulsion is used as a coolant for cutting or grinding aluminum or an aluminum alloy for aircraft materials. The used emulsion contains fine aluminum particles, sludge, lubricating oil for the cutting machine, grease, malodorous components and the like.

Figure 1:
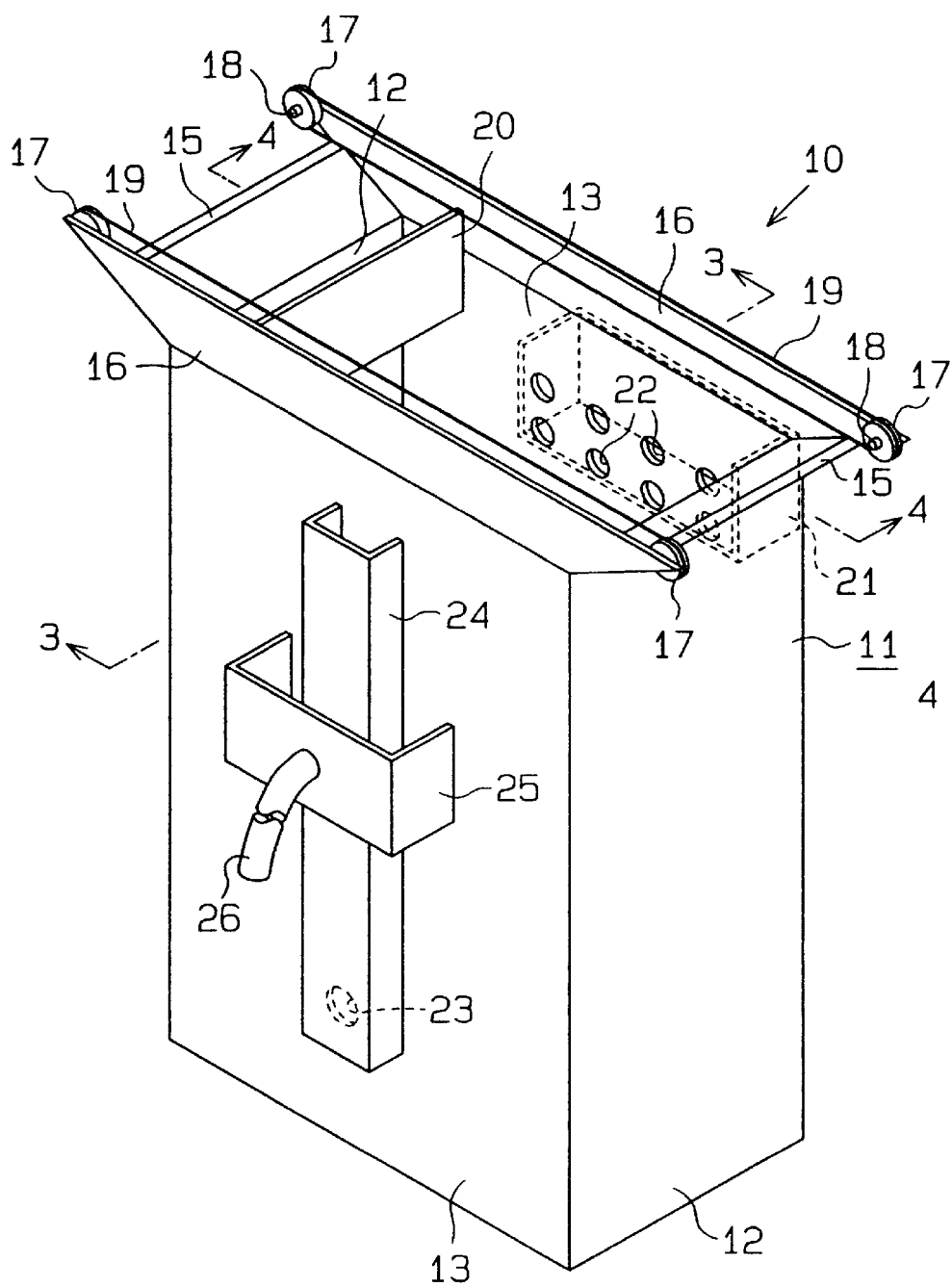
FIG. 1 is a perspective view showing a container of the apparatus for removing fine metal particles (remover) according to one embodiment of the present invention.

As shown in FIGS. 1, 3 and 4, a remover 10 includes a rectangular metallic container 11. The container 11 has a pair of short sidewalls 12, a pair of long sidewalls 13, and a bottom plate 14. The container 11 has an open top. A pair of small extensions 15 extend diagonally upward from the upper ends of the short sidewalls 12, respectively. A pair of large extensions 16 extend diagonally upward from the upper ends of the long sidewalls 13, respectively. Therefore, the opening of the container 11 is gradually increased by the small extensions 15 and the large extensions 16.

A pair of sprockets 17 are rotatably supported by shafts 18 at opposite ends of the large extensions 16, respectively. A chain 19 extends across each pair of sprockets 17. A rectangular plate-like squeegee 20 is attached to and between the chains. The squeegee 20 is perpendicular to the chains, and the length of the squeegee 20 is substantially equal to the width of the short sidewall 12. When the chains 19 move, the squeegee 20 moves in the left-light direction of FIG. 4.

As shown in FIGS. 1 and 3, the first long sidewall 13 is provided with a rectangular supply container 21. A plurality of supply ports 22 are defined in the first long sidewall 13. The used emulsion is poured into the supply container 21 and enters the container 11 through the supply ports 22.

A discharge port 23 is defined in the second long sidewall 13 to communicate with the inside of the container 11. The discharge port 23 is connected to a vertical discharge conduit 24 which extends along the second long sidewall 13 and is open at its top. As shown in FIG. 3, the upper opening of the discharge conduit 24 and that of the supply container 21 are located at substantially the same vertical position. A rectangular receiving container 25 is attached to the middle of the discharge conduit 24 to cover a part of the discharge conduit 24. The receiving container 25 is provided with a discharge pipe 26 communicating with the inside of the receiving container 25.

The emulsion in the container 11 is discharged into the discharge conduit 24 through the discharge port 23, and the emulsion overflows the discharge conduit 24 and flows into the receiving container 25.

Figure 2:
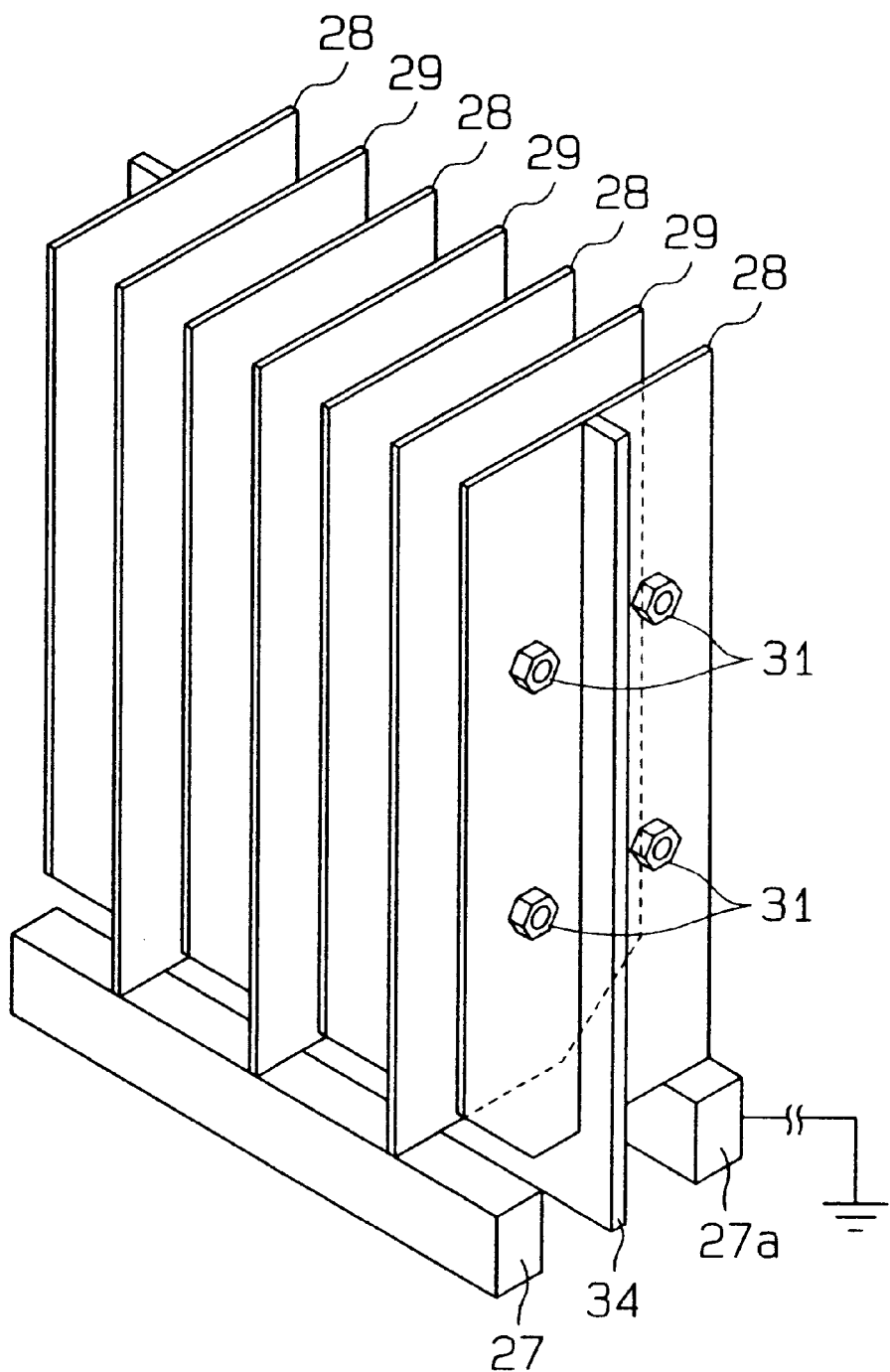
FIG. 2 is a perspective view of an internal part of the remover contained in the container shown in FIG. 1.

As shown in FIGS. 2 to 4, in the container 11, a pair of conductors 27 and 27a, both made of a metal material, are located on the bottom plate 14 beside the long sidewalls 13, respectively. The first conductor 27 is connected to a power supply (not shown), whereas the second conductor 27a is grounded.

On the first and second conductors 27 and 27a, anode plates 29 and cathode plates 28, both made of graphite, are arranged alternately at predetermined intervals. The end plate ends up with cathod plate 28. The anode plates 29 each have a generally rectangular form, and the corner of each anode plate 29 that is adjacent to the second conductor 27a is cut away. Therefore, the lower end of each anode plate 29 is in contact with the first conductor 27, and the cutaway portion of the anode plate 29 is spaced from the second conductor 27a. Like the anode plates 29, the cathode plates 28 each have a generally rectangular form, and the corner that is adjacent to the first conductor 27 is cut away. Therefore, the lower end of each cathode plate 28 is in contact with the second conductor 27a, and the cutaway portion of the cathode plate 28 is spaced from the first conductor 27. When a DC voltage is applied to the first conductor 27 from the power supply, the anode plates 29 and the cathode plates 28 are connected positively and negatively, respectively. The level of the DC voltage applied can be changed depending on the gap between the cathode plate 28 and the anode plate 29. However, the voltage to be applied is preferably 10 V or higher, to ensure sufficient $H_2$ bubble generation, i.e., electrolysis of the emulsion to achieve efficient removal of aluminum, sludge, grease, malodorous components and the like.

Four synthetic resin bolts 31 penetrate all of the cathode plates 28 and the anode plates 29 at a central region of the plates 28, 29. As shown in FIG. 4, a nut 32 made of a synthetic resin is engaged with the tip of each bolt 31. Cylindrical spacers 33 made of a synthetic resin are fitted on the periphery of the bolts 31 between each adjacent cathode plate 28 and anode plate 29 pair. The spacers 33 keep constant gaps between each adjacent cathode plate 28 and anode plate 29 pair.

The container 11 contains a substantially U-shaped partition 34 made of a synthetic resin. The partition 34 has a pair of upright portions located substantially along the center of the outermost anode plate 29 and that of the outermost cathode plate 28. A connecting portion which connects the pair of upright portions of the partition 34 is located between the plates 28, 29 and the bottom plate 14 of the container.

Next, the method of using the remover 10 for removing fine metal particles in an emulsion is described.

When an aluminum workpiece is cut, the emulsion a coolant is delivered into the supply container 21 and is supplied to the container 11 through the supply ports 22. As shown in FIG. 4, since each supply port 22 is positioned between a cathode plate 28 and an anode plate 29, the emulsion flows through the supply ports 22 into the spaces between the plates. Further, in FIG. 4, a part of the partition 34 is located between the rightmost cathode plate 28 and the associated short sidewall 12, and no supply port 22 opens into the spaces defined between that cathode plate 28 and short sidewall 12. Therefore, the emulsion does not flow into the space between that cathode plate 28 and that short sidewall 12. Likewise, the emulsion does not flow into the space defined between the leftmost catode plate 28 and the associated short sidewall 12.

When a DC voltage of 10 V (a current of 50 A) is applied to the first conductor 27 from a power supply, the anode plates 29 and the cathode plates 28 are connected positively and negatively, respectively. The large aluminum chips settle due to gravity to the bottom section of supporting plates 14.

The emulsion flows into the spaces defined between the plates 28, 29. The water in the emulsion undergoes electrolysis. As a result, hydrogen bubbles ($H_2$) are generated from the cathode plates 28, while hydroxide ions ($OH^-$) are generated by the anode plates 29. Fine aluminum particles, which remain unsettled, are dispersed in the solution, dissolved, and converted into aluminum ions ($Al^{3+}$)

Next, as shown in FIG. 4, hydrogen bubbles ($H_2$) generated at the cathode plates 28 ascend through the emulsion as fine bubbles, which causes an upward flow in the solution, and hydroxide ions ($OH^-$) generated from anode paltes 29 react with $Al^{3+}$ to form $Al(OH)_3$. $Al(OH)_3$ is attached to ascending $H_2$ bubbles, since $Al(OH)_3$ has the characteristics of stickiness. Thus, the solution is stirred to facilitate bonding of the $OH^-$ ions with the aluminum ions. As a result, particles of aluminum hydroxide $Al(OH)_3$ are formed. The ascending hydrogen bubbles adhere to the aluminum particles sludge, grease and malodorous contained in the emulsion and then float upward to the liquid surface.

Unnecessary aluminum, sludge, grease, malodorous components and the like are separated from the used emulsion by floating or settling to form a clean emulsion in the central portion of the solution. Further, since aluminum hydroxide is formed, almost no hydroxide ions remain in the emulsion. In addition, almost all hydrogen ions are converted to hydrogen molecules, so the emulsion is kept neutral.

The used oil in water emulsion is continuously supplied to the container 11 through the supply ports 22. Thus, the clean emulsion is discharged to the discharge conduit 24 through the discharge port 23. Further, the clean emulsion flows into the discharge conduit 24 until the fluid level reaches the level in the container 11 and then overflows the discharge conduit 24 into the receiving container 25. The clean emulsion is recovered in a recovery container, not shown, through the discharge pipe 26. Thus, clean oil in water emulsion, which maintains as the original coolant oil characteristics, is recovered.

The sprockets 17 are rotated, and the chains 19 move the squeegee 20 to sweep over the liquid surface. Thus, as shown in FIG. 3, the squeegee 20 scrapes matter from the liquid surface, including fine aluminum particles, sludge, grease and the like. Finally, after completion of the above operation, the aluminum chips deposited on the bottom plate 14 of the container 11 are removed. In the present embodiment, floating aluminum chips having particle size less than 1 $\mu$m or smaller can be removed effectively.

The present embodiment has the effects described below.

When the emulsion flows into the space defined between the plates 28, 29, hydrogen ($H_2$) are generated at the cathode plates 28 and ascend in the form of bubbles, which causes an upward flow in the emulsion. Then, aluminum hydroxide attached to $H_2$ bubbles floats to the liquid surface. Further, during floating process, sludge, grease and the like adhere to $H_2$ bubbles which are aluminum hydroxide and are carried to the liquid surface. As a result, fine aluminum particles, sludge, grease, malodorous components and the like are separated to produce clean oil in water emulsion.

Fine aluminum particles and the like in the emulsion are removed according to the method, which uses electrolysis. Therefore, this method requires no maintenance such as cleaning of clogged filters, which is required when a filter is used. Thus, the operation is more efficient.

Hydroxide ions generated at the anode plates 29 are bonded to aluminum ions to form aluminum hydroxide. In addition, hydrogen ions are converted to hydrogen. Therefore, the emulsion is kept neutral. This prevents corrosion of workpieces, which can occur when the emulsion is reused.

Since the anode plates 29 and the cathode plates 28 are arranged alternately, the emulsion flowing into the spaces between the plates 29, 28 is reliably electrolyzed. This ensures formation of hydrogen and aluminum hydroxide to produce a clean emulsion.

The anode plates 29 and the cathode plates 28 are arranged alternately at fixed intervals through the spacers 33 respectively. Therefore, a fixed amount of emulsion flows into each space between the plates 28, 29, which results in a homogeneous reaction.

The clean emulsion is delivered to the discharge conduit 24 through the discharge port 23 until the level reaches the fluid level in the container 11. The emulsion then overflows the discharge conduit 24 and is received by the receiving container 25. Therefore, the remover 10 requires no apparatus for pumping the clean emulsion, which reduces costs. In addition, by continuously supplying used emulsion through the supply ports 22, clean emulsion can be continuously recovered from the discharge conduit 24.

The container 11 has the squeegee 20, which is designed to move along the liquid surface in the direction of movement of the chains 19. Therefore, aluminum, sludge, grease and the like floating on the liquid surface are scraped off.

The cathode plates 28 and the anode plates 29 each have a flat plate shape. Therefore, the plates 28, 29 provide large contact areas for the emulsion, which improves the efficiency of removing aluminum, sludge, grease, malodorous components and the like, as compared with bar-shaped plates 28, 29.

An electrolytic treatment and chemical reactions were carried out in removing impurities from an emulsion to compare them in terms of throughput. In the comparison test, an 88 $cm^3$ cell was used for this treatment.

In the electrolytic treatment, the remover of this embodiment was used. In this treatment, fine aluminum particles and sludge contained in a used emulsion were removed completely, and grease was almost removed.

The present embodiment can be modified and practiced as follows.

The remover 10 may be used, for example, for an emulsion used in cutting and grinding of a metallic material other than aluminum, for example, an aluminum alloy, iron or nickel.

The discharge conduit 24 may be omitted. In such a case, the clean emulsion is directly recovered through the discharge port 23.

The anode plates 29 and the cathode plates 28 may be modified to have cylindrical shapes or the like.

The anode plates 29 and the cathode plates 28 may be formed from lead oxide, carbon felt, carbon wool or the like. Meanwhile, in the case where the oil in water emulsion has a low aluminum concentration, the anode plates 29 and the cathode plates 28 may be formed from a metal such as titanium, stainless steel or the like.

The sprockets 17, the chains 19 and the squeegee 20 may be omitted. Aluminum, sludge and grease floating on the liquid surface may be collected and recovered, for example, by blowing air from one small extension 15 toward the other small extension 15.

The partition 34 may be omitted. The objective is to minimize the unreacted zone.

It should be apparent to those skilled in the art that the present invention may be embodied in many other specific forms without departing from the spirit or scope of the invention. Particularly, it should be understood that the invention may be embodied in the following forms.

Therefore, the present examples and embodiments are to be considered as illustrative and not restrictive and the invention is not to be limited to the details given herein, but may be modified within the scope and equivalence of the appended claims.

What is claimed is:

1. An apparatus for electrochemically removing fine metal particles in an oil in water emulsion, the apparatus comprising:

a container for accommodating the oil in water emulsion;

a supply port for delivering the oil in water emulsion to the container;

a plurality of cathode plates and anode plates located in the container in a facing relationship, wherein the water and fine metal particles in the emulsion are electrolyzed to produce hydrogen, hydroxide ions, and metal ions when a predetermined direct voltage is applied between each anode plate and each cathode plate, wherein the hydroxide ions and the metal ions react to form metal hydroxide, and wherein the metal hydroxide and fine metal particles, which are insoluble in the oil in water emulsion, along with sludge, grease and lubricating oil which is the main cause of odor float with hydrogen generated by the electrolysis; and a discharge port located in the lower of the container for discharging emulsion from which the metal hydroxide and the insoluble fine metal particles have been removed.

2. The apparatus according to claim 1, wherein the fine metal particles are aluminum, aluminum alloy, iron or nickel.

3. The apparatus according to claim 2, wherein the fine metal particles are aluminum, and the fine metal hydroxide particles are aluminum hydroxide.

4. The apparatus according to claim 1, wherein each anode plate and cathode plate is substantially rectangular.

5. The apparatus according to claim 1, wherein the anode plates and cathode plates are arranged alternately at predetermined intervals.

6. The apparatus according to claim 1 further comprising a discharge conduit connected to the discharge port.

7. The apparatus according to claim 6, wherein the height of an upper end of the discharge port and that of the emulsion fluid level are substantially the same.

8. The apparatus according to claim 1 further comprising a squeegee for sweeping and removing the metal hydroxide and the insoluble fine metal particles from the liquid surface.

9. An electrochemical removing method for removing fine metal particles, the method comprising:

supplying an oil in water emulsion to a container from a supply port located on the container;

supplying the emulsion between a pair of plates that face one another, wherein one of the plates is an anode plate and the other is a cathode plate;

applying a predetermined direct voltage to the emulsion to electrolyze the water and fine metal particles in the emulsion to produce hydrogen, hydroxide ions, and metal ion, wherein the hydroxide ions and the metal ions react to form fine metal hydroxide;

removing the metal hydroxide and fine metal particles which are insoluble in the oil in water with hydrogen generated from the cathode plate by the electrolysis;

discharging emulsion from which the metal emulsion, hydroxide and the insoluble fine metal particles have been removed from a lower part of the container.

10. The method according to claim 9 further comprising connecting a discharging conduit to the container;

substantially aligning an upper end of the discharge conduit with the fluid level of the emulsion in the container; and causing the emulsion from which the metal hydroxide and the insoluble fine metal particles have been removed to overflow the end of the discharge conduit.

11. The method according to claim 9, wherein the fine metal particles are aluminum, and the fine metal hydroxide particles are aluminum hydroxide.

* * * * *